United States Patent
Meuresch et al.

(10) Patent No.: US 12,091,492 B2
(45) Date of Patent: Sep. 17, 2024

(54) METHOD FOR PRODUCING POLYOXYMETHYLENE POLYOXYALKYLENE BLOCK COPOLYMERS

(71) Applicant: Covestro Intellectual Property GmbH & Co. KG, Leverkusen (DE)

(72) Inventors: Markus Meuresch, Cologne (DE); Aurel Wolf, Wülfrath (DE); Christoph Guertler, Cologne (DE); Annika Stute, Cologne (DE)

(73) Assignee: Covestro Intellectual Property GmbH & Co. KG, Leverkusen (DE)

( * ) Notice: Subject to any disclaimer, the term of this patent is extended or adjusted under 35 U.S.C. 154(b) by 727 days.

(21) Appl. No.: 17/280,268

(22) PCT Filed: Oct. 21, 2019

(86) PCT No.: PCT/EP2019/078517
§ 371 (c)(1),
(2) Date: Mar. 26, 2021

(87) PCT Pub. No.: WO2020/083814
PCT Pub. Date: Apr. 30, 2020

(65) Prior Publication Data
US 2022/0049042 A1   Feb. 17, 2022

(30) Foreign Application Priority Data
Oct. 26, 2018   (EP) ..................... 18202839

(51) Int. Cl.
*C08G 2/38* (2006.01)
*C08G 2/06* (2006.01)
*C08L 59/02* (2006.01)

(52) U.S. Cl.
CPC .............. *C08G 2/38* (2013.01); *C08G 2/06* (2013.01); *C08L 59/02* (2013.01); *C08G 2650/62* (2013.01)

(58) Field of Classification Search
CPC ........ C08G 2/38; C08G 2/06; C08G 2650/62; C08G 64/34; C08G 64/183; C08G 65/2696; C08G 65/2663; C08G 65/2603; C08L 59/02; Y02P 20/582
See application file for complete search history.

(56) References Cited

U.S. PATENT DOCUMENTS

| | | |
|---|---|---|
| 3,404,109 A | 10/1968 | Milgrom |
| 3,436,375 A | 4/1969 | McAndrew |
| 3,575,930 A | 4/1971 | Dinbergs |
| 3,754,053 A | 8/1973 | Kray et al. |
| 3,829,505 A | 8/1974 | Herold |
| 3,941,849 A | 3/1976 | Herold |
| 4,380,620 A | 4/1983 | Matsuzaki et al. |
| 5,158,922 A | 10/1992 | Hinney et al. |
| 5,470,813 A | 11/1995 | Le-Khac |
| 5,482,908 A | 1/1996 | Le-Khac |
| 5,545,601 A | 8/1996 | Le-Khac |
| 5,627,120 A | 5/1997 | Le-Khac |
| 5,689,012 A * | 11/1997 | Pazos ................. C08G 65/2663 568/619 |
| 5,712,216 A | 1/1998 | Le-Khac et al. |
| 5,714,428 A | 2/1998 | Le-Khac |
| 6,780,813 B1 | 8/2004 | Hofmann et al. |
| 7,008,900 B1 | 3/2006 | Hofmann et al. |
| 2002/0016395 A1 | 2/2002 | Niino et al. |
| 2003/0158449 A1 | 8/2003 | Hofmann et al. |
| 2003/0204042 A1 | 10/2003 | Moethrath et al. |
| 2005/0027145 A1* | 2/2005 | Hofmann ................. B01J 27/26 568/679 |
| 2006/0009616 A1 | 1/2006 | Muck et al. |
| 2007/0299234 A1 | 12/2007 | Haider et al. |
| 2013/0289236 A1 | 10/2013 | Laitar et al. |

(Continued)

FOREIGN PATENT DOCUMENTS

| | | |
|---|---|---|
| EP | 3287475 A1 | 2/2018 |
| GB | 807589 A | 1/1959 |
| JP | H03263454 A | 11/1991 |

(Continued)

OTHER PUBLICATIONS

Bull. Chem. Soc. J., 1994, vol. 67, pp. 2560-2566.
International Search Report for Application No. PCT/EP2019/078517, mailed Jan. 20, 2020.
Haubs et al., Polyoxymethylenes, Ullmann's Encyclopedia of Industrial Chemistry, 2012.
Ionescu, Chemistry and Technology of Polyols for Polyurethanes, 2nd Edition, Rapra Techn. Ltd., 2016, Section 5.1.

*Primary Examiner* — Shane Fang
(74) *Attorney, Agent, or Firm* — Donald R. Palladino

(57) ABSTRACT

The invention relates to a method for producing a polyoxymethylene polyoxyalkylene block copolymer, said method including the process of reacting a polymer formaldehyde compound with alkylene oxide in the presence of a double metal cyanide (DMC) catalyst and an H-functional starter substance, wherein the theoretical molar mass of the polymer formaldehyde compound is lower than the theoretical molar mass of the H-functional starter substance, and the polymer formaldehyde compound has at least one terminal hydroxyl group, the theoretical molar mass of the H-functional starter substance being at least 500 g/mol. In the method according to the invention, a mixture i) is provided comprising the DMC catalyst and the H-functional starter substance in step (i); the polymer formaldehyde compound is then added to the mixture (i) in step (ii), thereby forming a mixture (ii); and the alkylene oxide is added in step (iii), step (ii) being carried out at the same time as or prior to step (iii).

10 Claims, No Drawings

(56) References Cited

U.S. PATENT DOCUMENTS

2016/0130407 A1    5/2016   Mueller et al.
2017/0096526 A1    4/2017   Peckermann et al.

FOREIGN PATENT DOCUMENTS

| JP | H04145123 A  | 5/1992  |
|----|--------------|---------|
| JP | H04306215 A  | 10/1992 |
| JP | 2928823 B2   | 8/1999  |
| JP | 2007211082 A | 8/2007  |
| WO | 2004096746 A1| 11/2004 |
| WO | 2018114843 A1| 6/2018  |

* cited by examiner

METHOD FOR PRODUCING POLYOXYMETHYLENE POLYOXYALKYLENE BLOCK COPOLYMERS

CROSS-REFERENCE TO RELATED APPLICATION

This application is a national stage application under 35 U.S.C. § 371 of PCT/EP2019/078517, filed Oct. 21, 2019, which claims the benefit of European Application No. 18202839.9, filed Oct. 26, 2018, each of which are incorporated by reference herein.

FIELD

The present invention describes a process for preparing polyoxymethylene-polyoxyalkylene block copolymers.

BACKGROUND

Block copolymers containing polyoxymethylene units alongside other polymer and polycondensate units are described, for example, in JP 2007 211082 A, WO 2004/096746 A1, GB 807589, EP 1 418 190 A1, U.S. Pat. Nos. 3,754,053, 3,575,930, US 2002/0016395, and JP 04-306215.

U.S. Pat. No. 3,575,930 describes the reaction of dihydroxy-terminated paraformaldehyde HO—$(CH_2O)_n$—H having n=2-64 with diisocyanates to give isocyanate-terminated polyoxymethylene polymers, which can be converted to polyurethane compounds in the reaction with diols.

JP 2007 211082 A describes the reaction of polyoxyalkylene polyols having an equivalent weight of ≥2500 with formaldehyde, formaldehyde oligomers or formaldehyde polymers to give polyoxymethylene-polyoxyalkylene block copolymers using anionic or cationic polymerization catalysts. The high molecular weight polyoxyalkylene polyol starters having low polydispersity used are prepared via double metal cyanide (DMC) catalysis. Because of the high molecular weight of the polyoxyalkylene polyols, the resultant polyoxymethylene-polyoxyalkylene block copolymers have a molecular weight of at least >5000 g/mol and are therefore less widely usable as a polyurethane unit. Furthermore, the direct reaction of the polyoxyalkylene polyols with the polyoxymethylene polymers via a melt-kneading process necessitates the use of high temperatures and corresponding specific high-viscosity apparatus (extruders, kneaders, etc.).

U.S. Pat. No. 3,754,053 describes polyoxymethylene-polyoxyalkylene block copolymers having a molecular weight of ≥10 000 g/mol. For preparation of copolymers having an inner polyoxymethylene block, in a first step, trioxane is converted to a polyoxymethylene prepolymer and the latter is then reacted with alkylene oxides in the presence of NaOH, for example, as polymerization catalyst. Here too, the polymers described are not very suitable for uses as a polyurethane unit because of their high molecular weight.

WO 2004/096746 A1 discloses the reaction of formaldehyde oligomers with alkylene oxides and/or isocyanates. In this method the described use of formaldehyde oligomers HO—$(CH_2O)_n$—H affords polyoxymethylene block copolymers having a relatively narrow molar mass distribution of n=2-19, an additional thermal removal process step being required for the provision of the formaldehyde oligomers from aqueous formalin solution. The obtained formaldehyde oligomer solutions are not storage-stable and therefore require immediate subsequent further processing. Moreover, these applications do not disclose differentiated activation conditions, for example the activation temperature or the alkoxylation catalysts used, which are disadvantageous from safety and quality-relevant aspects among others for any possible industrial scale application because of undefined temperature peaks during the exothermic polymerization process (22.7 kcal/mol PO from M. Ionescu; Chemistry and Technology of Polyols for Polyurethanes, Rapra Techn. Ltd., 2005). Furthermore, only block copolymers having very short formaldehyde blocks are obtainable via this method.

EP 1 870 425 A1 discloses a process for preparing polyoxyalkylene-containing polyols by condensation of substituted or unsubstituted phenol structures with formaldehydes and/or other substituted alkanal structures. The resulting phenol-formaldehyde condensates are used here as polyol starters for the alkoxylation, although no repeat oxymethylene units are formed within these starter compounds. In addition, the resulting properties of the alkoxylated polyols containing aromatic systems differ fundamentally from aliphatic polyol structures because of the different chemical structures.

WO2012/091968 A1 claims a process for preparing polyetherols by polymerization of alkylene oxides onto a starter compounds using DMC catalysts. In this case, the formaldehyde-associated structures disclosed are oligomeric phenol-formaldehyde condensates as corresponding starters, these differing fundamentally in structural terms from the polyoxymethylene starter structure.

WO02015/155094 A1 discloses a process for preparing polyoxymethylene block copolymers comprising the step of activating the DMC catalyst in the presence of an OH-terminated polymeric formaldehyde compound with a defined amount of alkylene oxide and an optional subsequent polymerization with alkylene oxides which is optionally carried out in the presence of further comonomers. In a first step the DMC catalyst is activated in the presence of the polymeric formaldehyde starter compound, wherein activation of the DMC catalyst is accomplished by adding a portion (based on the total amount of the amount of alkylene oxides employed in the activation and polymerization) of one or more alkylene oxides, and in a second step one or more alkylene oxides and optionally further comonomers are added to the mixture resulting from step (i). The activation of the DMC catalyst in the first step (i) is carried out at an activation temperature ($T_{act}$) of 20° C. to 120° C. However, this process has a long activation time. In addition, high catalyst loadings of up to 10 000 ppm are also disclosed, these increased amounts of catalyst having to be provided and also removed for subsequent applications after preparation of the polyoxymethylene block copolymer to reduce the proportion of the heavy metal-containing double metal cyanide catalyst. This process furthermore also employs low molecular weight suspension media such as toluene or cyclic propylene carbonate which are likewise disruptive for subsequent reactions, for example polyurethane preparation, and thus require removal from the product via sometimes complex and inconvenient thermal removal processes.

Starting from the prior art, it was accordingly an object of the present invention to provide a simple and economically advantageous process for preparing polyoxymethylene-polyoxyalkylene block copolymers based on oligomeric and polymeric forms of formaldehyde as the starter substance which overcomes the problems resulting from the prior art.

The amount of the double metal cyanide (DMC) catalyst was to be reduced and the use of low molecular weight suspension media was to be avoided. Suspension media directly employable with the resulting polyoxymethylene-polyoxyalkylene block copolymer as a reaction component in subsequent reactions were to be especially employed. It was a further object of the present invention to shorten the reaction time by reducing the activation time of the double metal cyanide (DMC) catalyst, thus making it possible to reduce even the total preparation time of polyoxymethylene-polyoxyalkylene block copolymers for a plurality of consecutive preparation cycles usually carried out in semi-batch mode. This also applies to the amount of the double metal cyanide (DMC) catalyst over several cycles.

SUMMARY

According to the invention this object is achieved by a process for preparing a polyoxymethylene-polyoxyalkylene block copolymer comprising reaction of a polymeric formaldehyde compound with alkylene oxides in the presence of a double metal cyanide (DMC) catalyst and an H-functional starter substance;
  wherein the theoretical molar mass of the polymeric formaldehyde compound is less than the theoretical molar mass of the H-functional starter substance;
  wherein the polymeric formaldehyde compound has at least one terminal hydroxyl group;
  wherein the theoretical molar mass of the H-functional starter substance is at least 500 g/mol; comprising the steps of:
    (i) initially charging a mixture i) comprising the DMC catalyst and the H-functional starter substance;
    (ii) adding the polymeric formaldehyde compound to mixture i) to form a mixture ii);
    (iii) adding the alkylene oxide;
  wherein step (ii) is carried out simultaneously with or prior to step (iii).

The present invention further provides the polyoxymethylene-polyoxyalkylene block copolymers obtainable by the process according to the invention, provides for the use thereof and provides polyurethane polymers containing the polyoxymethylene-polyoxyalkylene block copolymers according to the invention.

DETAILED DESCRIPTION

The use of the word "a" in connection with countable parameters should be understood here and hereinafter to mean the number one only when this is evident from the context (for example through the wording "precisely one"). Otherwise, expressions such as "an alkylene oxide", "a polymeric formaldehyde compound" etc. always also encompass embodiments in which two or more alkylene oxides, two or more polymeric formaldehyde compounds etc. are used.

The invention is illustrated in detail hereinafter. Various embodiments may be combined with one another as desired unless the opposite is clearly apparent to a person skilled in the art from the context.

Polyoxymethylene block copolymers in the context of the invention refer to polymeric compounds which contain at least one polyoxymethylene block and at least one additional oligomeric block (for example polyoxyalkylene or polyoxyalkylene carbonate blocks) and preferably do not exceed a molecular weight in the four-digit range.

In one embodiment of the process according to the invention, the polyoxymethylene-polyoxyalkylene blockcopolymer has a number-average molecular weight of 1000 g/mol to 10 000 g/mol, preferably of 1000 g/mol to 8400 g/mol, wherein the number-average molecular weight is determined by gel permeation chromatography (GPC) based on DIN 55672-1: "Gel permeation chromatography—Part 1: Tetrahydrofuran as elution solvent", wherein polystyrene samples of known molar mass are used for calibration.

The resultant polyoxymethylene block copolymers offer a number of advantages over existing polymers. Thus, particular physical properties such as glass transition temperatures, melting ranges, viscosities and solubilities etc. may be specifically controlled via the length of the polyoxymethylene blocks relative to the oligomeric polyoxyalkylene blocks.

Compared to polyoxymethylene homopolymers of the same molecular weight, partial crystallinity in the polyoxymethylene-polyoxyalkylene block copolymers of the invention is typically lowered, which typically likewise leads to a lowering of glass transition temperatures, melting points and viscosities, etc. The presence of additional polyoxyalkylene blocks additionally leads typically to a distinct increase in the chemical and thermal stability. In addition, the polyoxymethylene-polyoxyalkylene block copolymers obtained generally have good solubilities in various solvents, are usually meltable readily and without loss of mass, or are already in the liquid state at low temperatures. Compared to polyoxymethylene homopolymers, the polyoxymethylene-polyoxyalkylene block copolymers thus exhibit much better processability.

Compared to polyether polyols of the same molecular weight, the proportion of polyoxyalkylene units which are prepared from the corresponding alkylene oxides is reduced by the polyoxymethylene fraction, which contributes to an advantageous economic viability of the product. Various physical properties, such as glass transition temperatures, melting ranges, viscosities, solubility, etc., for a given molecular weight, can be controlled in a targeted manner via the length of the polyoxymethylene blocks in relation to the polyoxyalkylene blocks and via the molecular weight of the polymeric formaldehyde compound (polyoxymethylene block) used. The synthetically variable molecular structure of the polyoxymethylene-polyoxyalkylene block copolymers obtained additionally enables the creation of tailored "hard-soft" segments at the molecular level. Compared to random polyoxymethylene-polyoxyalkylene copolymers, the polyoxymethylene-polyoxyalkylene block copolymers obtained have higher internal order because of their segment structure.

This may result in advantageous physical properties, particularly of conversion products of these polymers, and hence enable new applications.

By means of the process according to the invention, it is especially possible to obtain polyoxymethylene-polyoxyalkylene block copolymers having an A-B-A block structure comprising an inner polyoxymethylene block (B) and outer oligomeric polyoxyalkylene blocks (A). It is likewise possible in accordance with the invention that formaldehyde compounds having a hydroxyl end group functionality F>2 are used, by means of which it is consequently possible to prepare homologous block structures B(-A)y having a number y>2 of outer oligomeric blocks (A) which results correspondingly from the functionality of the formaldehyde compound used. It is likewise possible in principle that formaldehyde compounds having a functionality F<2 are used; these may, for example, also be linear formaldehyde compounds with F=1 substituted at one end of the chain by a protecting group or by other chemical radicals.

A polyoxymethylene block in the context of the invention refers to a polymeric structural unit —(CH2-O—)x, wherein x is an integer ≥2, containing at least one CH2 group bonded to two oxygen atoms which is bonded via at least one of the oxygen atoms to further methylene groups or other polymeric structures. Polyoxymethylene blocks —(CH2-O—)x preferably contain an average of x≥2 to x≤1000, more preferably an average of x≥2 to x≤400 and especially preferably an average of x≥8 to x≤100 oxymethylene units. In the context of the invention a polyoxymethylene block is also to be understood as meaning blocks containing small proportions of further monomeric and/or oligomeric units, generally less than 25 mol % based on the total amount of the monomer units present in the block.

In the context of the invention polyoxyalkylene blocks in the context of the present invention also include blocks incorporating (small) proportions of further comonomers, generally less than 50 mol %, preferably less than 25 mol %, based on the total amount of all repeating units present in the oligomeric block.

The term "alkyl" in the context of the overall invention generally includes substituents from the group of n-alkyl such as methyl, ethyl or propyl, branched alkyl and/or cycloalkyl. The term "aryl" in the context of the overall invention generally includes substituents from the group of monocyclic carbo- or heteroaryl substituents such as phenyl and/or polycyclic carbo- or heteroaryl substituents which may optionally be substituted by further alkyl groups and/or heteroatoms such as nitrogen, oxygen, silicon, sulfur or phosphorus. The radicals R1, R2, R3 and/or R4 may be joined to one another within a repeating unit such that they form cyclic structures, for example a cycloalkyl radical incorporated into the polymer chain via two adjacent carbon atoms.

Polymeric Formaldehyde Compound

Suitable polymeric formaldehyde compounds for the process of the invention are in principle those oligomeric and polymeric forms of formaldehyde having at least one terminal hydroxyl group for reaction with the alkylene oxides and any further comonomers. According to the invention, the term "terminal hydroxyl group" is to be understood as meaning in particular a terminal hemiacetal functionality which is formed as a structural feature by the polymerization of formaldehyde. For example, the starter compounds may be oligomers and polymers of formaldehyde of general formula HO—(CH$_2$O)$_n$—H where n is an integer ≥2 and where polymeric formaldehyde typically has n>8 repeating units.

Polymeric formaldehyde compounds suitable for the process according to the invention generally have molecular weights from 62 to 30 000 g/mol, preferably from 62 to 12 000 g/mol, particularly preferably from 242 to 6000 g/mol and very particularly preferably from 242 to 3000 g/mol and comprise from 2 to 1000, preferably from 2 to 400, particularly preferably from 8 to 200 and very particularly preferably from 8 to 100 oxymethylene repeating units n. The compounds used in the process according to the invention typically have a functionality (F) of 1 to 3 but in certain cases can also be polyfunctional, i.e. have a functionality >3. The process according to the invention preferably employs open-chain polymeric formaldehyde compounds having terminal hydroxyl groups and having a functionality of 1 to 10, preferably of 1 to 5, particularly preferably of 2 to 3. It is very particularly preferable when the process according to the invention employs linear polymeric formaldehyde compounds having a functionality of 2. The functionality F corresponds to the number of OH end groups per molecule.

Preparation of the polymeric formaldehyde compounds used for the process according to the invention may be carried out by known processes (cf., for example, M. Haubs et al., 2012, Polyoxymethylenes, Ullmann's Encyclopedia of Industrial Chemistry; G. Reus et al., 2012, Formaldehyde, ibid.). The process according to the invention may in principle also employ the formaldehyde compounds in the form of a copolymer, wherein comonomers included in the polymer in addition to formaldehyde are, for example, 1,4-dioxane or 1,3-dioxolane. Further suitable formaldehyde copolymers for the process according to the invention are copolymers of formaldehyde and of trioxane with cyclic and/or linear formals, for example butanediol formal, or epoxides. It is likewise conceivable for higher homologous aldehydes, for example acetaldehyde, propionaldehyde, etc, to be incorporated into the formaldehyde polymer as comonomers. It is likewise conceivable for formaldehyde compounds according to the invention in turn to be prepared from H-functional starter compounds; obtainable here in particular through the use of polyfunctional compounds are polymeric formaldehyde compounds having a hydroxyl end group functionality F>2 (cf., for example, WO 1981001712 A1, Bull. Chem. Soc. J., 1994, 67, 2560-2566, U.S. Pat. No. 3,436,375, JP 03263454, JP 2928823).

As is well known, formaldehyde requires only the presence of small traces of water to polymerize.

In aqueous solution a mixture of oligomers and polymers of different chain lengths which are in equilibrium with molecular formaldehyde and formaldehyde hydrate is thus formed according to the concentration and the temperature of the solution. So-called paraformaldehyde here precipitates out of the solution as a white, poorly soluble solid and is generally a mixture of linear formaldehyde polymers where n=8 to 100 oxymethylene repeating units.

One particular advantage of the process of the invention is that polymeric formaldehyde or so-called paraformaldehyde, which is commercially available and inexpensive, may be used directly as a reactant without the need for additional preparatory steps. In an advantageous embodiment of the invention, paraformaldehyde is therefore employed as the reactant. It is in particular possible via the molecular weight and the end group functionality of the polymeric formaldehyde compound to introduce polyoxymethylene blocks of defined molar weight and functionality into the product.

The length of the polyoxymethylene block may advantageously be controlled in simple fashion in the process according to the invention via the molecular weight of the employed formaldehyde compound. Preferably employed here are linear formaldehyde compounds of general formula HO—(CH$_2$O)$_n$—H, wherein n is an integer ≥2, preferably where n=2 to 1000, particularly preferably where n=2 to 400 and very particularly preferably where n=8 to 100, having two terminal hydroxyl groups. Especially also employable as starter compounds are mixtures of polymeric formaldehyde compounds of formula HO—(CH$_2$O)$_n$—H having different values of n in each case. In an advantageous embodiment, the employed mixtures of polymeric formaldehyde compounds of formula HO—(CH$_2$O)$_n$—H contain at least 1% by weight, preferably at least 5% by weight and particularly preferably at least 10% by weight of polymeric formaldehyde compounds where n≥20.

In a preferred embodiment of the process according to the invention, the polymeric formaldehyde compound has 2 hydroxyl groups and 8 to 100 repeating oxymethylene units (n) or 3 hydroxyl groups and 8 to 100 repeating oxymethylene units (n).

Alkylene Oxide

Epoxides (alkylene oxides) used for preparing the polyoxymethylene block copolymers are compounds of general formula (I):

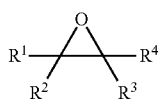

(I)

wherein $R^1$, $R^2$, $R^3$ and $R^4$ are independently of one another hydrogen or an alkyl or aryl radical optionally containing additional heteroatoms such as nitrogen, oxygen, silicon, sulfur or phosphorus and may optionally be joined to one another such that they form cyclic structures such as a cycloalkylene oxide for example.

In the context of the process according to the invention it is in principle possible to use any alkylene oxides suitable for polymerization in the presence of a DMC catalyst. If different alkylene oxides are used these may be metered in either as a mixture or consecutively. In the case of the latter metered addition, the polyether chains of the polyoxymethylene-polyoxyalkylene block copolymer obtained in this way may in turn likewise have a block structure.

The process according to the invention may generally employ alkylene oxides (epoxides) having 2-24 carbon atoms. The alkylene oxides having 2-24 carbon atoms are, for example, one or more compounds selected from the group consisting of ethylene oxide, propylene oxide, 1-butene oxide, 2,3-butene oxide, 2-methyl-1,2-propene oxide (isobutene oxide), 1-pentene oxide, 2,3-pentene oxide, 2-methyl-1,2-butene oxide, 3-methyl-1,2-butene oxide, 1-hexene oxide, 2,3-hexene oxide, 3,4-hexene oxide, 2-methyl-1,2-pentene oxide, 4-methyl-1,2-pentene oxide, 2-ethyl-1,2-butene oxide, 1-heptene oxide, 1-octene oxide, 1-nonene oxide, 1-decene oxide, 1-undecene oxide, 1-dodecene oxide, 4-methyl-1,2-pentene oxide, butadiene monoxide, isoprene monoxide, cyclopentene oxide, cyclohexene oxide, cycloheptene oxide, cyclooctene oxide, styrene oxide, methylstyrene oxide, pinene oxide, mono- or polyepoxidized fats as mono-, di- and triglycerides, epoxidized fatty acids, C1-C24 esters of epoxidized fatty acids, epichlorohydrin, glycidol, and derivatives of glycidol, for example methyl glycidyl ether, ethyl glycidyl ether, 2-ethylhexyl glycidyl ether, allyl glycidyl ether, glycidyl methacrylate and epoxy-functional alkyloxysilanes, for example 3-glycidyloxypropyltrimethoxysilane, 3-glycidyloxypropyltriethoxysilane, 3-glycidyloxypropyltripropoxysilane, 3-glycidyloxypropylmethyldimethoxysilane, 3-glycidyloxypropylethyldiethoxysilane, 3-glycidyloxypropyltriisopropoxysilane. The epoxide of general formula (I) is preferably a terminal epoxide wherein R1, R2 and R3 are hydrogen and R4 may be hydrogen, an alkyl or aryl radical optionally containing additional heteroatoms such as nitrogen, oxygen, silicon, sulfur or phosphorus and may differ in different repeating units. Preferably employed alkylene oxides are ethylene oxide and/or propylene oxide, especially propylene oxide.

Double Metal Cyanide (DMC) Catalyst

The double metal cyanide compounds present in the DMC catalysts usable with preference in the process according to the invention are the reaction products of water-soluble metal salts and water-soluble metal cyanide salts.

Double metal cyanide (DMC) catalysts for use in the homopolymerization of alkylene oxides are known in principle from the prior art (see, for example, U.S. Pat. Nos. 3,404,109, 3,829,505, 3,941,849 and 5,158,922). DMC catalysts, which are described, for example, in U.S. Pat. No. 5,470,813, EP-A 700 949, EP-A 743 093, EP-A 761 708, WO 97/40086, WO 98/16310 and WO 00/47649, have a very high activity and allow preparation of polyether carbonates at very low catalyst concentrations. A typical example is that of the highly active DMC catalysts described in EP-A 700 949 which, as well as a double metal cyanide compound (e.g. zinc hexacyanocobaltate(III)) and an organic complex ligand (e.g. tert-butanol), also contain a polyether having a number-average molecular weight greater than 500 g/mol.

The DMC catalysts which can be used in accordance with the invention are preferably obtained by
(1.) reacting an aqueous solution of a metal salt with the aqueous solution of a metal cyanide salt in the presence of one or more organic complex ligands, e.g. an ether or alcohol, in a first step,
(2.) removing the solid from the suspension obtained from (a) by known techniques (such as centrifugation or filtration) in a second step,
(3.) optionally washing the isolated solid with an aqueous solution of an organic complex ligand (for example by resuspending and subsequent reisolating by filtration or centrifugation) in a third step,
(4.) and subsequently drying the solid obtained at temperatures of in general 20-120° C. and at pressures of in general 0.1 mbar to atmospheric pressure (1013 mbar), optionally after pulverizing,
wherein in the first step or immediately after the precipitation of the double metal cyanide compound (second step) one or more organic complex ligands, preferably in excess (based on the double metal cyanide compound), and optionally further complex-forming components are added.

The double metal cyanide compounds present in the DMC catalysts that can be used in accordance with the invention are the reaction products of water-soluble metal salts and water-soluble metal cyanide salts.

By way of example, an aqueous zinc chloride solution (preferably in excess relative to the metal cyanide salt) and potassium hexacyanocobaltate are mixed and then dimethoxyethane (glyme) or tert-butanol (preferably in excess, relative to zinc hexacyanocobaltate) is added to the resulting suspension.

Metal salts suitable for preparing the double metal cyanide compounds preferably have a composition according to the general formula (II), $$M(X)_n \qquad (II)$$

wherein
M is selected from the metal cations $Zn^{2+}$, $F^{2+}$, $Ni^{2+}$, $Mn^{2+}$, $Co^{2+}$, $Sr^{2+}$, $Sn^{2+}$, $Pb^{2+}$ and $Cu^{2+}$; M is preferably $Zn^{2+}$, $Fe^{2+}$, $Co^{2+}$ or $Ni^{2+}$,
X are one or more (i.e. different) anions, preferably an anion selected from the group of halides (i.e. fluoride, chloride, bromide, iodide), hydroxide, sulfate, carbonate, cyanate, thiocyanate, isocyanate, isothiocyanate, carboxylate, oxalate and nitrate;
n is 1 if X=sulfate, carbonate or oxalate and
n is 2 if X=halide, hydroxide, carboxylate, cyanate, thiocyanate, isocyanate, isothiocyanate or nitrate,
or suitable metal salts preferably have a composition according to the general formula (III)

$$M_r(X)3 \qquad (III)$$

wherein
M is selected from the metal cations $Fe^{3+}$, $Al^{3+}$, $Co^{3+}$ and $Cr^{3+}$,
X comprises one or more (i.e. different) anions, preferably an anion selected from the group of the halides (i.e. fluoride, chloride, bromide, iodide), hydroxide, sulfate, carbonate, cyanate, thiocyanate, isocyanate, isothiocyanate, carboxylate, oxalate and nitrate;
r is 2 if X=sulfate, carbonate or oxalate and
r is 1 if X=halide, hydroxide, carboxylate, cyanate, thiocyanate, isocyanate, isothiocyanate or nitrate,
or suitable metal salts preferably have a composition according to the general formula (IV)

$$M(X)_s \quad (IV)$$

wherein
M is selected from the metal cations $Mo^{4+}$, $V^{4+}$ and $W^{4+}$,
X comprises one or more (i.e. different) anions, preferably an anion selected from the group of halides (i.e. fluoride, chloride, bromide, iodide), hydroxide, sulfate, carbonate, cyanate, thiocyanate, isocyanate, isothiocyanate, carboxylate, oxalate and nitrate;
s is 2 if X=sulfate, carbonate or oxalate and
s is 4 if X=halide, hydroxide, carboxylate, cyanate, thiocyanate, isocyanate, isothiocyanate or nitrate,
or suitable metal salts preferably have a composition according to general formula (V)

$$M(X)_r \quad (V)$$

wherein
M is selected from the metal cations $Mo^{6+}$ and $W^{6+}$,
X comprises one or more (i.e. different) anions, preferably anions selected from the group of the halides (i.e. fluoride, chloride, bromide, iodide), hydroxide, sulfate, carbonate, cyanate, thiocyanate, isocyanate, isothiocyanate, carboxylate, oxalate and nitrate;
t is 3 if X=sulfate, carbonate or oxalate and
t is 6 if X=halide, hydroxide, carboxylate, cyanate, thiocyanate, isocyanate, isothiocyanate or nitrate.

Examples of suitable metal salts are zinc chloride, zinc bromide, zinc iodide, zinc acetate, zinc acetylacetonate, zinc benzoate, zinc nitrate, iron(II) sulfate, iron(II) bromide, iron(II) chloride, iron(III) chloride, cobalt(II) chloride, cobalt(II) thiocyanate, nickel(II) chloride and nickel(II) nitrate. It is also possible to use mixtures of different metal salts.

Metal cyanide salts suitable for preparing the double metal cyanide compounds preferably have a composition according to the general formula (VI)

$$(Y)_a M'(CN)_b (A)_c \quad (VI)$$

wherein
M' is selected from one or more metal cations from the group consisting of Fe(II), Fe(III), Co(II), Co(III), Cr(II), Cr(III), Mn(II), Mn(III), Ir(III), Ni(II), Rh(III), Ru(II), V(IV) and V(V); M' is preferably one or more metal cations from the group consisting of Co(II), Co(III), Fe(II), Fe(III), Cr(III), Ir(III) and Ni(II),
Y is selected from one or more metal cations from the group consisting of alkali metal (i.e. $Li^+$, $Na^+$, $K^+$, $Rb^+$) and alkaline earth metal (i.e. $Be^{2+}$, $Mg^{2+}$, $Ca^{2+}$, $Sr^{2+}$, $Ba^{2+}$),
A is selected from one or more anions from the group consisting of halides (i.e. fluoride, chloride, bromide, iodide), hydroxide, sulfate, carbonate, cyanate, thiocyanate, isocyanate, isothiocyanate, carboxylate, azide, oxalate or nitrate, and
a, b and c are integers, the values for a, b and c being selected such as to ensure the electronic neutrality of the metal cyanide salt; a is preferably 1, 2, 3 or 4; b is preferably 4, 5 or 6; c preferably has the value 0.

Examples of suitable metal cyanide salts are sodium hexacyanocobaltate(III), potassium hexacyanocobaltate(III), potassium hexacyanoferrate(II), potassium hexacyanoferrate(III), calcium hexacyanocobaltate(III) and lithium hexacyanocobaltate(III).

Preferred double metal cyanide compounds included in the DMC catalysts which can be used in accordance with the invention are compounds having compositions according to the general formula (VII)

$$M_x[M'_{x'}(CN)_y]_z \quad (VII),$$

in which M is defined as in the formulae (I) to (IV) and M' is as defined in formula (V), and
x, x', y and z are integers and are selected such as to ensure the electronic neutrality of the double metal cyanide compound.
Preferably,
x=3, x'=1, y=6 and z=2,
M=Zn(II), Fe(II), Co(II) or Ni(II) and
M'=Co(III), Fe(III), Cr(III) or Ir(III).

Examples of suitable double metal cyanide compounds a) are zinc hexacyanocobaltate(III), zinc hexacyanoiridate(III), zinc hexacyanoferrate(III) and cobalt(II) hexacyanocobaltate(III). Further examples of suitable double metal cyanide compounds can be found, for example, in U.S. Pat. No. 5,158,922 (column 8, lines 29-66). With particular preference it is possible to use zinc hexacyanocobaltate(III).

The organic complex ligands which can be added in the preparation of the DMC catalysts are disclosed in, for example, U.S. Pat. No. 5,158,922 (see, in particular, column 6, lines 9 to 65), U.S. Pat. Nos. 3,404,109, 3,829,505, 3,941,849, EP-A 700 949, EP-A 761 708, JP 4 145 123, U.S. Pat. No. 5,470,813, EP-A 743 093 and WO-A 97/40086). For example, organic complex ligands used are water-soluble organic compounds having heteroatoms, such as oxygen, nitrogen, phosphorus or sulfur, which can form complexes with the double metal cyanide compound. Preferred organic complex ligands are alcohols, aldehydes, ketones, ethers, esters, amides, ureas, nitriles, sulfides and mixtures thereof. Particularly preferred organic complex ligands are aliphatic ethers (such as dimethoxyethane), water-soluble aliphatic alcohols (such as ethanol, isopropanol, n-butanol, isobutanol, sec-butanol, tert-butanol, 2-methyl-3-buten-2-ol and 2-methyl-3-butyn-2-ol), compounds which include both aliphatic or cycloaliphatic ether groups and aliphatic hydroxyl groups (such as ethylene glycol mono-tert-butyl ether, diethylene glycol mono-tert-butyl ether, tripropylene glycol monomethyl ether and 3-methyl-3-oxetanemethanol, for example). Extremely preferred organic complex ligands are selected from one or more compounds of the group consisting of dimethoxyethane, tert-butanol 2-methyl-3-buten-2-ol, 2-methyl-3-butyn-2-ol, ethylene glycol mono-tert-butyl ether and 3-methyl-3-oxetanemethanol.

In the preparation of the DMC catalysts that can be used in accordance with the invention, one or more complex-forming components are optionally used from the compound classes of the polyethers, polyesters, polycarbonates, polyalkylene glycol sorbitan esters, polyalkylene glycol glycidyl ethers, polyacrylamide, poly(acrylamide-co-acrylic acid), polyacrylic acid, poly(acrylic acid-co-maleic acid), polyacrylonitrile, polyalkyl acrylates, polyalkyl methacrylates, polyvinyl methyl ether, polyvinyl ethyl ether, polyvinyl acetate, polyvinyl alcohol, poly-N-vinylpyrrolidone, poly (N-vinylpyrrolidone-co-acrylic acid), polyvinyl methyl ketone, poly(4-vinylphenol), poly(acrylic acid-co-styrene), oxazoline polymers, polyalkyleneimines, maleic acid copolymers and maleic anhydride copolymers, hydroxyethylcellulose and polyacetals, or of the glycidyl ethers, glycosides, carboxylic esters of polyhydric alcohols, gallic acids or salts, esters or amides thereof, cyclodextrins, phosphorus compounds, α,β-unsaturated carboxylic esters, or ionic surface-active or interface-active compounds.

In the preparation of the DMC catalysts that can be used in accordance with the invention, preference is given to using the aqueous solutions of the metal salt (e.g. zinc chloride) in the first step in a stoichiometric excess (at least 50 mol %) relative to the metal cyanide salt. This corresponds to at least a molar ratio of metal salt to metal cyanide salt of 2.25:1.00. The metal cyanide salt (e.g. potassium hexacyanocobaltate) is reacted in the presence of the organic complex ligand (e.g. tert-butanol) to form a suspension which contains the double metal cyanide compound (e.g. zinc hexacyanocobaltate), water, excess metal salt, and the organic complex ligand.

The organic complex ligand may be present in the aqueous solution of the metal salt and/or of the metal cyanide salt or it is added directly to the suspension obtained after precipitation of the double metal cyanide compound. It has proven advantageous to mix the metal salt and metal cyanide salt aqueous solutions and the organic complex ligand by stirring vigorously. Optionally, the suspension formed in the first step is subsequently treated with a further complex-forming component. This complex-forming component is preferably used in a mixture with water and organic complex ligand. A preferred process for performing the first step (i.e. the preparation of the suspension) is effected using a mixing nozzle, particularly preferably using a jet disperser, as described, for example, in WO-A 01/39883.

In the second step, the solid (i.e. the precursor of the catalyst) can be isolated from the suspension by known techniques, such as centrifugation or filtration.

In a preferred variant, the isolated solid is subsequently washed in a third process step with an aqueous solution of the organic complex ligand (for example by resuspension and subsequent reisolation by filtration or centrifugation). In this way, for example, water-soluble by-products, such as potassium chloride, can be removed from the catalyst that can be used in accordance with the invention. The amount of the organic complex ligand in the aqueous washing solution is preferably between 40 and 80% by weight, based on the total solution.

Optionally, in the third step, the aqueous wash solution is admixed with a further complex-forming component, preferably in the range between 0.5% and 5% by weight, based on the overall solution.

It is also advantageous to wash the isolated solid more than once. In a first washing step (3.-1), washing is preferably effected with an aqueous solution of the unsaturated alcohol (for example by resuspension and subsequent reisolation by filtration or centrifugation), in order thereby to remove, for example, water-soluble by-products, such as potassium chloride, from the catalyst usable in accordance with the invention. The amount of the unsaturated alcohol in the aqueous wash solution is more preferably between 40% and 80% by weight, based on the overall solution of the first washing step. In the further washing steps (3.-2), either the first washing step is repeated one or more times, preferably from one to three times, or, preferably, a nonaqueous solution, for example a mixture or solution of unsaturated alcohol and further complex-forming component (preferably in the range between 0.5 and 5 wt %, based on the total amount of the washing solution of step (3.-2)), is employed as the washing solution, and the solid is washed therewith one or more times, preferably one to three times.

The isolated and optionally washed solid can then be dried, optionally after pulverization, at temperatures of 20-100° C. and at pressures of 0.1 mbar to atmospheric pressure (1013 mbar).

A preferred process for isolating the DMC catalysts employable in accordance with the invention from the suspension by filtration, filtercake washing and drying is described in WO-A 01/80994.

The DMC catalyst is preferably used in an amount such that the content of DMC catalyst in the resulting reaction product is 100 to 800 ppm, preferably 200 to 700 ppm, based on the sum of the masses of the polymeric formaldehyde compound, the alkylene oxide and the H-functional starter substance, i.e. the reaction product.

It is a characteristic of DMC catalysts that they exhibit specific "catch-up" kinetics (M. Ionescu; Chemistry and Technology of Polyols for Polyurethanes $2^{nd}$ Edition, Rapra Techn. Ltd., 2016 section 5.1), wherein for mixtures of H-functional starter substances of low equivalent weight and high equivalent weight the alkoxylation, especially the propoxylation, preferably takes place at the H-functional starter substance of low equivalent weight.

H-Functional Starter Substance

The H-functional starter substances generally have an OH functionality (i.e. the number of H atoms active in respect of the polymerization per molecule) of 1 to 8, preferably of 2 to 6 and more preferably of 2 to 4. The H-functional starter substances are used either individually or as a mixture of at least two H-functional starter substances.

As H-functional starter substances ("starters") the process according to the invention may employ compounds having alkoxylation-active H atoms and having a theoretical molar mass of ≥500 g/mol, preferably of 600 to 6000 g/mol and particularly preferably of 700 to 5000 g/mol.

The process according to the invention employs H-functional starter substances having a theoretical molar mass of at least 500 g/mol, preferably from 600 g/mol to 5000/mol and particularly preferably from 750 g/mol to 4000 g/mol, wherein the theoretical molar mass of the polymeric formaldehyde compound is less than the theoretical molecular weight of the H-functional starter substance. Consequently, as a result of the characteristic "catch-up" kinetics of the DMC catalyst used according to the invention, the polymeric formaldehyde compound is preferentially alkoxylated.

Alkoxylation-active groups having active H atoms are, for example, —OH, —NH$_2$ (primary amines), —NH— (secondary amines), —SH, and —CO$_2$H, preferably —OH and —NH$_2$, more preferably —OH.

H-functional starter substances used are, for example, one or more compounds selected from the group consisting of mono- or polyhydric alcohols, polyfunctional amines, polyfunctional thiols, amino alcohols, thio alcohols, hydroxy esters, polyether polyols, polyester polyols, polyester ether polyols, polyethercarbonate polyols, polycarbonate polyols, polycarbonates, polyethyleneimines, polyetheramines, polytetrahydrofurans (e.g. PolyTHF® from BASF), polytetrahydrofuran amines, polyether thiols, polyacrylate polyols, castor oil, the mono- or diglyceride of ricinoleic acid, monoglycerides of fatty acids, chemically modified mono-, di- and/or triglycerides of fatty acids, and $C_1$-$C_{24}$ alkyl fatty acid esters containing an average of at least 2 OH groups per molecule.

In one embodiment of the process according to the invention, the H-functional starter substance is one or more compound(s) and is selected from the group consisting of polyoxyalkylene polyol, polyether polyol, polyester polyol, polycarbonate polyol, polyether polyester polyol, polyether carbonate polyol, polyether polyester carbonate polyol, preferably a polyether polyol.

Polyether Polyol

The H-functional starter substances may also be selected from the class of the polyether polyols, in particular those having a number-average molecular weight Mn in the range from 500 to 4000 g/mol, preferably from 750 to 3500 g/mol. Preference is given to polyether polyols constructed from repeating ethylene oxide and propylene oxide units, preferably having a proportion of propylene oxide units of from 35% to 100%, particularly preferably having a proportion of propylene oxide units of from 50% to 100%. These may be random copolymers, gradient copolymers, alternating copolymers or block copolymers of ethylene oxide and propylene oxide. Suitable polyether polyols constructed from repeating propylene oxide and/or ethylene oxide units are for example the Desmophen®-, Acclaim®-, Arcol®-, Baycoll®-, Bayfill®-, Bayflex®-, Baygal®-, PET®- and polyether polyols from Covestro AG (e.g. Desmophen® 3600Z, Desmophen® 1900U, Acclaim® Polyol 2200, Acclaim® Polyol 40001, Arcol® Polyol 1004, Arcol® Polyol 1010, Arcol® Polyol 1030, Arcol® Polyol 1070, Baycoll® BD 1110, Bayfill® VPPU 0789, Baygal® K55, PET® 1004, Polyether® S180). Further suitable homopolyethylene oxides are for example the Pluriol® E products from BASF SE, suitable homopolypropylene oxides are for example the Pluriol® P products from BASF SE, suitable mixed copolymers of ethylene oxide and propylene oxide are for example the Pluronic® PE or Pluriol® RPE products from BASF SE.

Polyester Polyol

The H-functional starter substances may also be selected from the class of polyester polyols, especially those having a molecular weight $M_n$ in the range from 500 to 4500 g/mol. Polyesters having a functionality of at least two can be used as polyester polyols. Polyester polyols preferably consist of alternating acid and alcohol units. Examples of acid components that may be used include succinic acid, maleic acid, maleic anhydride, adipic acid, phthalic anhydride, phthalic acid, isophthalic acid, terephthalic acid, tetrahydrophthalic acid, tetrahydrophthalic anhydride, hexahydrophthalic anhydride, or mixtures of the recited acids and/or anhydrides. Alcohol components employed include for example ethanediol, 1,2-propanediol, 1,3-propanediol, 1,4-butanediol, 1,5-pentanediol, neopentyl glycol, 1,6-hexanediol, 1,4-bis(hydroxymethyl)cyclohexane, diethylene glycol, dipropylene glycol, trimethylolpropane, glycerol, pentaerythritol or mixtures of the stated alcohols. Using dihydric or polyhydric polyether polyols as the alcohol component affords polyesterether polyols which may likewise be used as starter substances for preparation of the polyethercarbonate polyols. It is preferable to use polyether polyols having $M_n$=150 to 2000 g/mol for preparation of the polyesterether polyols.

Polycarbonate Diol

H-functional starter substances that may be employed further include polycarbonate diols, in particular those having a molecular weight Mn in the range from 500 to 4500 g/mol, preferably 500 to 2500 g/mol, prepared, for example, by reaction of phosgene, dimethyl carbonate, diethyl carbonate or diphenyl carbonate and difunctional alcohols or polyester polyols or polyether polyols. Examples for polycarbonates can be found, for example, in EP-A 1359177. Polycarbonate diols that may be used include for example the Desmophen® C line from Covestro AG, for example Desmophen® C 1100 or Desmophen® C 2200.

Polyether Carbonate Polyols and/or Polyether Ester Carbonate Polyols

In a further embodiment of the invention, polyether carbonate polyols and/or polyether ester carbonate polyols may be used as H-functional starter substances. In particular, it is possible to use polyetherestercarbonate polyols. To this end, these polyether carbonate polyols and/or polyether ester carbonate polyols used as H-functional starter substances may be prepared beforehand in a separate reaction step.

Polyoxymethylene-Polyoxyalkylene Block Copolymer (A)

In one embodiment of the process according to the invention, the H-functional starter substance is a polyether polyol, wherein the polyether polyol is a polyoxymethylene-polyoxyalkylene block copolymer (A).

In a preferred embodiment the polyoxymethylene-polyoxyalkylene block copolymer (A) is prepared by reaction of a polymeric formaldehyde compound (A) with alkylene oxides (A) in the presence of a double metal cyanide (DMC) catalyst (A).

The polyoxymethylene-polyoxyalkylene block copolymer (A) is initially prepared and may after optional removal of the solvent, wherein removal is preferred, be directly employed as an H-functional starter compound in the process according to the invention for preparing the polyoxymethylene-polyoxyalkylene blockcopolymer.

In a preferred embodiment, the polyoxymethylene-polyoxyalkylene block copolymer (A) has an identical functionality to the polyoxymethylene-polyoxyalkylene block copolymer and the number-average molecular weight of the polyoxymethylene-polyoxyalkylene block copolymer (A) diverges from that of the polyoxymethylene-polyoxyalkylene block copolymer by up to 20%, preferably 10% and particularly preferably 5%, wherein the number-average molecular weight was determined using gel permeation chromatography (GPC) based on DIN 55672-1: "Gel permeation chromatography—Part 1: Tetrahydrofuran as elution solvent", wherein polystyrene samples of known molar mass were used for calibration.

In this preferred embodiment, additional storage for the polyoxymethylene-polyoxyalkylene block copolymer (A) is no longer required, thus resulting in a simplified process.

Polymeric Formaldehyde Compound (A)

In one embodiment of the process according to the invention, the polymeric formaldehyde compound (A) is used, wherein said compound has the same definition as the polymeric formaldehyde compound according to the invention.

Alkylene Oxide (A)

In one embodiment of the process according to the invention, the alkylene oxide (A) is used, wherein said compound has the same definition as the alkylene oxide according to the invention. In a preferred embodiment, the alkylene oxide is ethylene oxide and/or propylene oxide, particularly preferably propylene oxide.

Double Metal Cyanide (DMC) Catalysts (A) and (B)

In one embodiment of the process according to the invention, the double metal cyanide (DMC) catalysts (A) and optionally (B) are used, wherein these have the same definition as the double metal cyanide (DMC) catalyst according to the invention.

In a preferred embodiment of the process according to the invention, the double metal cyanide (DMC) catalyst comprises the double metal cyanide (DMC) catalyst (A) and optionally a double metal cyanide (DMC) catalyst (B), wherein in a particularly preferred embodiment of the process according to the invention, the mass ratio of the double metal cyanide (DMC) catalyst (A) based on the sum of the masses of double metal cyanide (DMC) catalyst (A) and double metal cyanide (DMC) catalyst (B) is 40% by weight to 100% by weight.

In a further preferred embodiment, the double metal cyanide (DMC) catalyst comprises the double metal cyanide (DMC) catalyst (A) and the double metal cyanide (DMC) catalyst (B) and the double metal cyanide (DMC) catalyst (B) is added to the polyoxymethylene-polyoxyalkylene block copolymer (A) as claimed in claim. This markedly reduces the activation time ($t_{act}$) for the inventive process for preparing the polyoxymethylene-polyoxyalkylene block copolymer and reduces the polydispersity of this block copolymer of the resulting block copolymers. In the context of the process according to the invention, the activation time ($t_{act}$) is to be understood as meaning the time interval between achieving the target temperature (t0) and onset of the alkoxylation reaction (t1), wherein time (t0) is to be understood as meaning achievement of a constant temperature and pressure after complete addition of the alkylene oxide in step (iii) and onset of the exothermic alkoxylation reaction in the reactor coupled with a simultaneous pressure drop at time (t1).

In a particularly preferred embodiment of the process according to the invention, the mass ratio of the double metal cyanide (DMC) catalyst (A) based on the sum of the masses of double metal cyanide (DMC) catalyst (A) and double metal cyanide (DMC) catalyst (B) is 30% by weight to 90% by weight, preferably from 40% by weight to 70% by weight.

The process according to the invention comprises step (i) of initially charging a mixture i) comprising the DMC catalyst and the H-functional starter substance, followed by step ii) of adding the polymeric formaldehyde compound to mixture (i) to form a mixture (ii) and step (iii) of adding the alkylene oxide, wherein step (ii) is carried out simultaneously with or prior to step (iii).

There follows a description of several variants for performing the process according to the invention for preparing polyoxymethylene block copolymers by addition of alkylene oxides and optionally further comonomers onto polymeric formaldehyde compounds in the presence of a the H-functional starter substance. The illustration is merely illustrative and should not be understood such that it restricts the present invention.

The process according to the invention is characterized in that in the first step (i) the mixture (i) comprising the DMC catalyst and the H-functional starter substance is initially charged in a reactor, wherein the theoretical molar mass of the polymeric formaldehyde compound is less than the theoretical molar mass of the H-functional starter substance and wherein the theoretical molar mass of the H-functional starter substance is at least 500 g/mol.

It is in principle also possible to employ a mixture of different H-functional starter substances according to the invention and/or DMC catalysts according to the invention.

The H-functional starter substance used in the process according to the invention may be produced in an upstream reaction step in the presence of the DMC catalyst according to the invention, preferably of the DMC catalyst (A) according to the invention. Alternatively, the DMC catalyst according to the invention, preferably the DMC catalyst (B) according to the invention, can also be added after preparation of the H-functional starter substance, thus affording the mixture (i). In a further embodiment, the preparation of the H-functional starter substance may be carried out in the presence of the DMC catalyst (A) according to the invention before DMC catalyst (B) according to the invention is added to the mixture of DMC catalyst (A) and H-functional starter substance, thus affording the mixture (i).

Step (ii) of the process according to the invention is characterized in that the polymeric formaldehyde compound is added (i) to mixture (i) to form a mixture (ii). Water and/or other volatile compounds are optionally removed from this mixture (ii) by elevated temperature and/or reduced pressure ("drying"), wherein additional DMC catalyst (B) is added to the polymeric formaldehyde compound or the suspension medium before or after the drying. The polymeric formaldehyde compound may in principle be initially charged as a mixture with further polymeric formaldehyde compounds which then affords the mixture (ii).

In a preferred embodiment of the process according to the invention step (ii) is carried out prior to step (iii).

Step (iii) of the process according to the invention comprises adding the alkylene oxide.

In a preferred embodiment of the process according to the invention, it has been found that the polymerization to prepare the polyether block in the polyoxymethylene-polyoxyalkylene block copolymers (step (iii)) is advantageously performed at 50° C. to 150° C., preferably at 60° C. to 145° C., particularly preferably at 70° C. to 140° C. and very particularly preferably at 70° C. to 130° C.

When temperatures are set to below 50° C. the reaction proceeds disproportionately slowly. At temperatures above 150° C. the amount of unwanted by-products rises significantly.

To achieve further activation of the DMC catalyst in the presence of the polymeric formaldehyde compound, step (iii) may optionally comprise adding a portion (based on the total amount of alkylene oxides employed in the activation and polymerization) of one or more alkylene oxides to the mixture (ii), wherein this addition of a portion of alkylene oxide may optionally be carried out in the presence of further comonomers, such as especially $CO_2$, and wherein the temperature spike ("hotspot") which occurs due to the exothermic chemical reaction that follows and/or a pressure drop in the reactor is then awaited in each case, and wherein the step (iii) for achieving activation may also be carried out repeatedly.

In a further embodiment of the process according to the invention, the polymerization of the alkylene oxides in step (iii) is effected in the presence of a further comonomer. Employable further comonomers include for example any oxygen-containing cyclic compounds, especially cyclic ethers, for example oxetane, THF, dioxane or cyclic acetals, for example 1,3-dioxolane or 1,3-dioxepane, cyclic esters, for example propiolactone, γ-butyrolactone, γ-valerolactone, ε-caprolactone, or cyclic acid anhydrides, for example maleic anhydride, glutaric anhydride or phthalic anhydride, and carbon dioxide. Preference is given to using carbon dioxide as comonomer.

Further comonomers may be metered into the reaction in pure form, in solution or as a mixture with one or more alkylene oxides. The metered addition of further comonomers may likewise be carried out simultaneously with or subsequently to the metered addition of the alkylene oxides.

The metered addition of one or more alkylene oxides may be carried out simultaneously or sequentially via separate metered additions in each case or via one or more metered additions. If two or more alkylene oxides are used for synthesis of the polyoxymethylene block copolymers, the alkylene oxides may be metered in individually or as a mixture.

In a further embodiment of the process of the invention, the polymerization is effected in the presence of at least one comonomer. Further comonomers may be metered into the reaction in pure form, in solution or otherwise in any industrially realizable forms. The metered addition of one or more alkylene oxides and the comonomers may be carried out simultaneously or sequentially, wherein the total amount of comonomers may be added all at once or in the form of a metered addition over the reaction time. In a preferred embodiment of the invention, carbon dioxide is metered in as a comonomer. The metered addition of one or more alkylene oxides is carried out simultaneously or sequentially with the metered addition of carbon dioxide. Via the manner of metered addition of the alkylene oxides and the comonomers, preferably carbon dioxide, it is possible to synthesize polyoxymethylene block copolymers having random, alternating, block-type or gradient-type polyether and/or polyoxyalkylene carbonate blocks.

The three steps (i), (ii) and (iii) may be performed in the same reactor or each performed separately in different reactors. Particularly preferred reactor types for the process of the invention are stirred tanks, tubular reactors, and loop reactors. If the reaction steps (i), (ii) and (iii) are performed in different reactors, a different reactor type may be used for each step. In the case of completely continuous reaction management the individual steps should preferably be spatially separate from one another, i.e. steps (i) and (ii) spatially separate from (iii), so that a separate temperature management and suitable gas introduction and application of reduced pressure, addition of polymeric formaldehyde and metered addition of monomers in the individual steps are possible according to the invention.

The molecular weight of the polyoxymethylene-polyoxyalkylene block copolymers according to the invention is in particular the additive sum of the molecular weights of the polymeric formaldehyde compound and the copolymerized blocks formed by the reaction with alkylene oxide.

The weight- and number-average of the molecular weight of the polyoxymethylene-polyoxyalkylene block copolymers is determined by gel permeation chromatography (GPC). The procedure is based on DIN 55672-1: "Gel permeation chromatography—Part 1: Tetrahydrofuran as elution solvent". Polystyrene samples of known molar mass are used for calibration.

The polyoxymethylene-polyoxyalkylene block copolymers obtainable by the process of the invention have a block structure comprising an inner polyoxymethylene block (B) comprising at least two and at most 1000 oxymethylene units, preferably at least 2 and at most 400 oxymethylene units, more preferably from 8 to 200 and most preferably at least 8 and at most 100 oxymethylene units, and at least one outer oligomeric polyoxyalkylene block (A) preferably comprising a proportion of at least 25 mol %, more preferably at least 50 mol %, of polyoxyalkylene units, based on the total amount of all oligomer units in this block. The number of outer oligomeric blocks (A) results accordingly from the functionality of the formaldehyde compound used. Preferably, the polyoxymethylene-polyoxyalkylene block copolymer consists exclusively of the blocks A and B.

The polyoxymethylene-polyoxyalkylene block copolymers according to the invention preferably have terminal hydroxyl groups and preferably have a functionality $F \geq 2$ (number of hydroxyl groups per molecule).

EXAMPLES

Compounds Used:
Paraformaldehyde (Granuform M®) from Ineos was used. Propylene oxide was sourced from Sigma-Aldrich and used without purification. The DMC catalyst used in all examples was DMC catalyst prepared according to example 6 in WO 01/80994 A1, containing zinc hexacyanocobaltate, tert-butanol and polypropylene glycol having a number-average molecular weight of 1000 g/mol.

Description of the Method
$^1$H NMR

The composition of the polymer was determined by $^1$H NMR (Bruker DPX 400, 400 MHz; pulse program zg30, relaxation time D1: 10 s, 64 scans). Each sample was dissolved in deuterated chloroform. The relevant resonances in the $^1$H NMR (based on TMS=0 ppm) and the assignment of the area integrals (A) are as follows:

cyclic propylene carbonate (cPC), by-product, with resonance at 4.5 ppm, area integral corresponds to one hydrogen atom;

monomeric propylene oxide (PO), which is not been fully depleted, with resonance at 2.4 and 2.75 ppm, each area integral corresponds to one H atom;

polypropylene oxide (PPO), PO homopolymer, with resonances at 1.0 to 1.2 ppm, area integral corresponds to 3 H atoms;

poly- or paraformaldehyde (pFA) with resonances at 4.6 to 5.2 ppm, area integral minus one H atom of cyclic propylene carbonate (cPC) thus corresponds to 2 hydrogen atoms;

The mole fractions (x) of the reaction mixture are determined as follows:
x(cPC)=A(4.5 ppm)
x(PO)=A(2.75 ppm) or A(2.4 ppm)
x(PPO)=A(1.0-1.2 ppm)/3
x(pFA)=(A(4.6-5.2 ppm)-x(cPc)-x(1PC))/2

The percentage mole fraction is calculated by dividing the mole fraction (x) of the respective component by the sum of the mole fractions present in the sample. The weight fraction is also calculated by multiplying the mole fractions (x) by the accompanying molar masses and dividing by the sum of the weight fractions present. Conversion of the weight fractions uses the following molar masses (g/mol): cPC=102, PO and PPO=58, pFA=30. The polymer composition is calculated and normalized using the proportions of PPO and pFA so that here too the reported amounts are in parts by weight out of 100 (% by weight).

GPC

The weight-average and number-average molecular weights Mw and Mn of the resulting polymers were determined by gel permeation chromatography (GPC). The procedure was based on DIN 55672-1: "Gel permeation chromatography—Part 1: Tetrahydrofuran as elution solvent". Polystyrene samples of known molar mass were used for calibration. The polydispersity index is calculated from that of the quotient of the weight-average and number-average molecular weights.

Example 1 (Comparative)

Preparation of Polyoxymethylene-polyalkene Oxide Block Copolymer (A-1) As H-functional Starter Substance, DMC Total Catalyst Loading of 2000 ppm 1400 mg of dried unactivated DMC catalyst were suspended in 200.0 g of 4-methyl-2-oxo-1,3-dioxolane (also referred to hereinafter as cyclic propylene carbonate or cPC) in a 1.0 L pressure reactor fitted with a gas introduction means. The suspension was heated to 130° C. with stirring (500 rpm). Simultaneously a vacuum was applied for 30 min and the pressure was set to 100 mbar with a constant volume flow of nitrogen through the reactor (vacuum stripping). Once vacuum stripping was complete the vacuum pump was deactivated and the reactor was cooled to room temperature and brought to ambient pressure using nitrogen. 157.2 g of paraformaldehyde were added to the suspension and the reactor was resealed. The reactor internal temperature was set to 70° C. 160 g of propylene oxide were quickly added to the suspension at an addition rate of 10 g/min. Once addition was complete and after achievement of a constant pressure (time t0) the mixture was left until an exothermic reaction in the reactor coupled with a simultaneous pressure drop (time t1) was observable. The time interval between addition (t0) and onset of reaction (t1) is hereinbelow referred to as the activation time ($t_{act}$). After the exothermic reaction had abated, the remaining amount of propylene oxide (362.8 g) was added at an addition rate of 3 g/min. Once addition was complete the mixture was stirred at 70° C. until the exothermic reaction had abated and until a constant pressure was achieved. The average molecular weight (determined by gel permeation chromatography) and the activation time are reported in table 1. The product was subsequently freed of the cPC in a thin-film evaporator (150° C., 0.05 mbar) and the reaction product is hereinbelow referred to as polyoxymethylene-polyalkylene oxide block copolymer (A-1).

Example 2

Preparation of a Polyoxymethylene-Polyoxyalkylene Block Copolymer (A-2) Using the Polyoxymethylene-Polyalkylene Oxide Block Copolymer (A-1) Having a DMC Total Catalyst Loading of 667 ppm 21.6 g of paraformaldehyde (21.6 g) were suspended in 45 g of the above-prepared polyoxymethylene-polyalkylene oxide block copolymer (A-1) in a 300 ml pressure reactor having gas and liquid addition means. A total of three times the suspension was subjected to 25 bar of $N_2$ at room temperature with stirring before the pressure was subsequently reduced to 5 bar of nitrogen (pressure stripping). Once pressure stripping was complete a pressure of 10 bar was established with nitrogen. The total amount of the propylene oxide (68.4 g) was subsequently added to the reactor. The reactor internal temperature was set to 70° C. and the suspension stirred at 500 rpm. After achievement of a constant temperature and pressure (time $t_0$) the mixture was left until an exothermic reaction in the reactor coupled with a simultaneous pressure drop (time $t_1$) was observable. The time interval between achieving the target temperature ($t_0$) and onset of reaction ($t_1$) is hereinbelow referred to as the activation time ($t_{act}$). Once the exothermic reaction had abated the mixture was stirred at 70° C. until abatement of the exothermic reaction and until a constant pressure was achieved. The average molecular weight (determined by gel permeation chromatography) and the activation time are reported in table 1.

Example 3

Preparation of a Polyoxymethylene-Polyoxyalkylene Block Copolymer (A-3) Using the Polyoxymethylene-Polyalkylene Oxide Block Copolymer (A-2) Having a DMC Total Catalyst Loading of 222 ppm A polyoxymethylene-polyoxyalkylene block copolymer (A-3) was prepared according to example 2 but using the product from example 2 (A-2) as solvent instead of the polyoxymethylene-polyoxyalkylene oxide block copolymer (A-1).

Example 4

Preparation of a Polyoxymethylene-Polyoxyalkylene Block Copolymer (A-4) Using the Polyoxymethylene-Polyalkylene Oxide Block Copolymer (A-3) Having a DMC Total Catalyst Loading of 500 ppm A polyoxymethylene-polyoxyalkylene block copolymer was prepared according to example 3 but using the product from example 3 (A-3) as solvent instead of the product from example 2 (A-2). In addition, 0.058 g of DMC catalyst was added to the initial suspension.

Example 5 (Comparative)

Preparation of a Polyoxymethylene-polyoxyalkylene Block Copolymer Using 1000 ppm of DMC Catalyst and Toluene as Solvent 500 mg of dried, unactivated DMC catalyst were suspended in 250.0 g of toluene in a 1.0 L pressure reactor using a gas introduction means. The suspension was heated to 130° C. with stirring (500 rpm). An $N_2$ pressure of 40 bar was applied before the $N_2$ pressure was reduced to 15 bar again. The application and release of $N_2$ pressure was performed twice further in the same way (pressure stripping). Once pressure stripping was complete the reactor was cooled to room temperature and brought to ambient pressure using nitrogen. 112.3 g of paraformaldehyde were added to the suspension and the reactor was resealed. This was followed by renewed pressure stripping at room temperature. The reactor internal temperature was set to 70° C. After achieving the temperature 120 g of propylene oxide were quickly added to the suspension at an addition rate of 10 g/min (activation). Once addition was complete and after achievement of a constant pressure (time $t_0$) the mixture was left until an exothermic reaction in the reactor coupled with a simultaneous pressure drop (time $t_1$) was observable. The time interval between addition ($t_0$) and onset of reaction ($t_1$) is hereinbelow referred to as the activation time ($t_{act}$). After the exothermic reaction had abated the reactor temperature was increased to 100° C. and the remaining amount of propylene oxide (376.7 g) was added at an addition rate of 3 g/min. Once addition was complete the mixture was stirred at 70° C. until the exothermic reaction had abated and until a constant pressure was achieved. The average molecular weight (determined by gel permeation chromatography) and the activation time are reported in table 1.

Example 6 (Comparative)

Preparation of a Polyoxymethylene-polyoxyalkylene Block Copolymer Using 500 ppm of DMC Catalyst and Toluene as Solvent A polyoxymethylene-polyoxyalkylene block copolymer was to be prepared according to example 4 but with only 250 mg of catalyst being added to the reactor at commencement of the reaction (500 ppm catalyst loading). After addition of the 120 g of propylene oxide during activation, neither an exothermic reaction nor a pressure drop were observable over a period of 8 hours.

Example 7

Preparation of a Polyoxymethylene-Polyoxyalkylene Block Copolymer Using 513 Ppm of DMC Catalyst and Polypropylene Glycol (2000 g/Mol, PPG2000) as Solvent 308 mg of dried, unactivated DMC catalyst were suspended in 200 g of a bifunctional polyether polyol (polypropylene glycol, PPG 2000 g/mol, Covestro AG, containing 131 mg of activated DMC catalyst) and 157.1 g of paraformaldehyde in a 1.0 L pressure reactor having a gas introduction means. The suspension was pretreated by vacuum stripping at 60° C. with stirring (500 rpm). Once vacuum stripping was complete (40 mbar) the reactor internal temperature was set to 70° C. and 45 g of propylene oxide were quickly added to the suspension at an addition rate of 10 g/min. Once addition was complete and after achievement of a constant pressure (time t0) the mixture was left until an exothermic reaction in the reactor coupled with a simultaneous pressure drop (time t1) was observable. The time interval between addition (t0) and onset of reaction (t1) is hereinbelow referred to as the activation time ($t_{act}$). After the exothermic reaction had abated, the remaining amount of propylene oxide (452.7 g) was added at an addition rate of 3 g/min. Once addition was complete the mixture was stirred at 70° C. until the exothermic reaction had abated and until a constant pressure was achieved. The average molecular weight (determined by gel permeation chromatography) and the activation time are reported in table 1.

TABLE 1

| Example | Suspension medium[a]/H-functional starter substance[b] | $t_{act}$ [min] | Catalyst loading [c] [ppm] | Mn (GPC, g/mol)[d] | PDI |
|---|---|---|---|---|---|
| 1 (A-1) (comp.) | cPC [a] | 142 | 2000 | 2784 | 1.06 |
| 2 (A-2) | (A-1) [b] | 15 | 667 | 2828 | 1.26 |
| 3 (A-3) | (A-2) [b] | 130 | 222 | 2889 | 1.52 |
| 4 (A-4) | (A-3) [b] | 40 | 500 | 2825 | 1.41 |
| 5 (comp.) | Toluene[a] | 128 | 810 | 3441 | 1.21 |
| 6 (comp.) | Toluene[a] | >480 | 404 | No polymer [e] | — |
| 7 | PPG2000 | 35 | 513 | 3036 | 1.04 |

[a] suspension medium,
[b] H-functional starter substance
[c] DMC catalyst loading based on the sum of the masses of the polymeric formaldehyde compound, the alkylene oxide and the H-functional starter substance
[d] number-average molecular weight of the polyoxymethylene-polyoxyalkylene block copolymer
[e] no chain-extended product Table 1 summarizes the results for the preparation of the polyoxymethylene-polyoxyalkylene block copolymers produced by the process according to the invention in examples 2 to 4 compared to the noninventive block copolymers in examples 1, 5 and 6. Comparative example 5 reflects the teaching of example 7 of WO2015/155094 A1. The polyoxymethylene-polyoxyalkylene block copolymers prepared according to the inventive process exhibit markedly shorter activation times with comparable catalyst loading (e.g. example 2) than comparative systems (e.g. comparative example 5). Furthermore, reactions to afford the block copolymers are also possible at markedly lower catalyst loadings (e.g. example 3) whereas the noninventive process, even at higher catalyst loadings (for example comparative example 6), no longer achieves reaction of the polymeric formaldehyde compound with the alkylene oxide and thus no longer affords chain-extended polyoxymethylene-polyoxyalkylene block copolymer products.

The invention claimed is:

1. A process for preparing a polyoxymethylene-polyoxyalkylene block copolymer comprising reacting a polymeric formaldehyde compound with an alkylene oxide in the presence of a double metal cyanide (DMC) catalyst and an H-functional starter substance;
   wherein the theoretical molar mass of the polymeric formaldehyde compound is less than the theoretical molar mass of the H-functional starter substance;
   wherein the polymeric formaldehyde compound has at least one terminal hydroxyl group; and
   wherein the theoretical molar mass of the H-functional starter substance is at least 500 g/mol;
   the process comprising:
   (i) initially charging a mixture i) comprising the DMC catalyst and a polyoxymethylene-polyoxyalkylene block copolymer H-functional starter;
   (ii) adding the polymeric formaldehyde compound to mixture i) to form a mixture ii); and
   (iii) adding the alkylene oxide;
   wherein step (ii) is carried out simultaneously with or prior to step (iii), and wherein the polyoxymethylene-polyoxyalkylene block copolymer H-functional starter has an identical functionality to the polyoxymethylene-polyoxyalkylene block copolymer produced by the process and the number-average molecular weight of the polyoxymethylene-polyoxyalkylene block copolymer H-functional starter diverges from that of the polyoxymethylene-polyoxyalkylene block copolymer produced by the process by up to 10%.

2. The process as claimed in claim 1, wherein the polyoxymethylene-polyoxyalkylene blockcopolymer has a number-average molecular weight of 1000 g/mol to 10000 g/mol.

3. The process as claimed in claim 1, wherein the polyoxymethylene-polyoxyalkylene block copolymer H-functional starter is the same as the polyoxymethylene-polyoxyalkylene block copolymer produced by the process.

4. The process as claimed in claim 1, wherein the polyoxymethylene-polyoxyalkylene block copolymer H-functional starter comprises a reaction product of a polymeric formaldehyde compound with an alkylene oxide in the presence of a DMC catalyst (A).

5. The process as claimed in claim 1, wherein the DMC catalyst is used in a theoretical amount of 100 to 800 ppm, based on the sum of the masses of the polymeric formaldehyde compound, of the alkylene oxide and of the H-functional starter substance.

6. The process as claimed in claim 4, wherein the double metal cyanide (DMC) catalyst comprises the double metal cyanide (DMC) catalyst (A) and optionally a double metal cyanide (DMC) catalyst (B), wherein the DMC catalyst (B) is present with the polyoxymethylene-polyoxyalkylene block copolymer H-functional starter.

7. The process as claimed in claim 6, wherein the mass ratio of the double metal cyanide (DMC) catalyst (A) based on the sum of the masses of double metal cyanide (DMC) catalyst (A) and double metal cyanide (DMC) catalyst (B) is 30% by weight to 90% by weight.

8. The process as claimed in claim 1, wherein the polymeric formaldehyde compound has 2 hydroxyl groups and 8 to 100 repeating oxymethylene units (n) or 3 hydroxyl groups and 8 to 100 repeating oxymethylene units (n).

9. The process as claimed in claim 1, wherein step (iii) is carried out at a temperature of 50° C. to 150° C.

10. The process of claim 1, wherein the mixture i) consists of the DMC catalyst and the polyoxymethylene-polyoxyalkylene block copolymer H-functional starter, and the polymeric formaldehyde is subsequently added to mixture i) to form a mixture ii).

\* \* \* \* \*